(12) United States Patent
Ji (10) Patent No.: US 10,641,507 B2
(45) Date of Patent: May 5, 2020

(54) TUNING BUILDING CONTROL SYSTEMS

(71) Applicant: Siemens Aktiengesellschaft, Munich (DE)

(72) Inventor: Kun Ji, Plainsboro, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 850 days.

(21) Appl. No.: 14/855,634

(22) Filed: Sep. 16, 2015

(65) Prior Publication Data

US 2017/0074533 A1   Mar. 16, 2017

(51) Int. Cl.
| | |
|---|---|
| *F24F 11/30* | (2018.01) |
| *G05B 6/02* | (2006.01) |
| *F24F 11/62* | (2018.01) |
| *G05B 11/42* | (2006.01) |
| *G05B 13/02* | (2006.01) |

(52) U.S. Cl.
CPC .............. *F24F 11/30* (2018.01); *F24F 11/62* (2018.01); *G05B 6/02* (2013.01); *G05B 11/42* (2013.01); *G05B 13/0265* (2013.01)

(58) Field of Classification Search
CPC .................................. G05B 6/02; G05B 11/42
See application file for complete search history.

(56) References Cited

U.S. PATENT DOCUMENTS

| | | | | |
|---|---|---|---|---|
| 6,031,966 A * | 2/2000 | Nakatani | ................. | G01P 3/489 |
| | | | | 360/70 |
| 6,198,246 B1 * | 3/2001 | Yutkowitz | .............. | G05B 11/42 |
| | | | | 318/561 |
| 8,406,522 B1 * | 3/2013 | Owechko | ............. | G06K 9/6229 |
| | | | | 382/181 |
| 2004/0031776 A1 * | 2/2004 | Gevelber | ............. | B05B 12/082 |
| | | | | 219/121.36 |
| 2005/0289467 A1 * | 12/2005 | Imhof | .................... | G05B 15/02 |
| | | | | 715/734 |
| 2006/0111863 A1 * | 5/2006 | Suda | ....................... | G01M 9/06 |
| | | | | 702/117 |

(Continued)

OTHER PUBLICATIONS

Yuting et al., "Study on PIO parameters Tuning Based on Particle Swarm Optimization", Oct. 25, 2013, Scientific.net, p. 1, url: https://www.scientific.net/AMR.823.432/preview.gif.*

(Continued)

*Primary Examiner* — Santosh R Poudel (57) ABSTRACT

Technical solutions are described for tuning a building control system, such as a variable air volume system, which includes intervened control loops. In one aspect, a method includes receiving a performance objective of the system. The method also includes generating a collection of values for parameters of the control loops based on stored information that includes a stored velocity and a stored position. The method also includes evaluating the collection of values for the parameters by comparing a performance measure and the performance objective of the system. In response to a difference between the performance objective and the performance measure satisfying a predetermined threshold the collection of values are stored and the control loops are configured according to the stored information for the parameters. The present document further describes examples of other aspects such as systems, computer products.

14 Claims, 4 Drawing Sheets

(56) References Cited

U.S. PATENT DOCUMENTS

| | | | | |
|---|---|---|---|---|
| 2008/0114500 | A1* | 5/2008 | Hull | G05D 23/19 700/300 |
| 2009/0198386 | A1* | 8/2009 | Kim | H02P 9/102 700/298 |
| 2010/0023307 | A1* | 1/2010 | Lee | G05B 23/0254 703/7 |
| 2011/0257800 | A1* | 10/2011 | Al-Hamouz | G05B 13/024 700/287 |
| 2012/0043414 | A1* | 2/2012 | Omar | G05D 1/102 244/17.13 |
| 2012/0259477 | A1* | 10/2012 | Abido | H02J 3/38 700/297 |
| 2012/0292251 | A1* | 11/2012 | Palmer | C02F 3/006 210/614 |
| 2013/0085614 | A1* | 4/2013 | Wenzel | G05D 23/1923 700/277 |
| 2013/0197676 | A1* | 8/2013 | Salsbury | G05B 13/02 700/32 |
| 2014/0069429 | A1* | 3/2014 | Lucci | A61M 16/0051 128/204.21 |
| 2016/0194074 | A1* | 7/2016 | Hagerott | B64C 13/16 701/5 |
| 2016/0209031 | A1* | 7/2016 | Lou | F23N 5/242 |

OTHER PUBLICATIONS

Xiaohui Hu, "Particle Swarm Optimization: Tutorial", pp. 1-5, URL: http://www.swarmintelligence.org/tutorials.php.*

Muhammad Asif Rana et al.: "Automatic control of ball and beam system using Particle Swarm Optimization"; Computational intelligence and informatics (CINTI); 12th International Symposium on; IEEE; pp. 529-534; XP032078831; DOI: 10.1109/CINTI.2011.6108563 / Nov. 21, 2011.

Hassen T. Dorrah et al.: "PSO-BELBIC scheme for two-coupled distillation column process"; Journal of advanced research; Elsevier; Amsterdam; NL; vol. 2; No. 1. pp. 73-83; XP028144271; ISSN 2090-1232 / Jul. 3, 2010.

Zeng Yaohui et al.: "Predictive modeling and optimization of a multi-zone HVAC system with data mining and firefly algorithms"; Energy; vol. 86; pp. 393-402; XP029225456; ISSN: 0360-5442; DOI: 10.1016/J.ENERGY.2015.04.045 / May 15, 2015.

Gupta Rohit et al.:"Fractional order sytem identification and controller design using PSO"; 2014 Innovative Applications of Computational Intelligence on Power Energy and Controls with their, impact on Humanity; (CIPECH); IEEE; pp. 149-153; XP032728342; DOI: 10.1109/CIPECH.2014.7019053 / Nov. 28, 2014.

European Search Report dated Feb. 9, 2017; Application No. 16187988.7; Filing Date: Sep. 9, 2016; 8-pages.

* cited by examiner

TUNING BUILDING CONTROL SYSTEMS

BACKGROUND

The present application relates to tuning a building control system, and more specifically, to tuning a Proportional Integral Derivative (PID) controller corresponding to the building control system.

While PID controllers are applicable to many control problems, they typically provide sub-optimal control. Traditionally, the PID controller is a feedback system, with constant parameters, and no direct knowledge of the process that the PID controller manages. Thus, typically overall performance of the PID controller is reactive.

SUMMARY

According to an embodiment, a method for tuning a system, which includes intervened control loops, includes receiving, by the system, a performance objective of the system. The method also includes generating, by the system, a collection of values for parameters of the control loops based on stored information that includes a stored velocity and a stored position; evaluating, by the system, the collection of values for the parameters of the control loops. The evaluating includes determining, by the system, a performance measure of the system using the collection of values. The evaluating further includes comparing, by the system, the performance measure and the performance objective of the system. The method also includes, in response to a difference between the performance objective and the performance measure satisfying a predetermined threshold, updating the stored information by storing the collection of values as a stored collection of values for the parameters. Further, in response to a predetermined termination condition being satisfied, the control loops are configured according to the stored information for the parameters.

According to another embodiment, a variable air volume (VAV) system includes a first proportional-integral-derivative (PID) controller that modulates a supply air damper of the VAV system via a first control loop. The VAV system also includes a second PID controller that modulates a reheat coil of the VAV system via a second control loop. The first control loop and the second control loop are intervened with each other. The VAV system also includes a processor that generates a collection of values for parameters of the first control loop and the second control loop based on stored information that includes a stored velocity and a stored position. The processor evaluates the collection of values based on a comparison of a predetermined performance objective of the system and a performance measure calculated based on the collection of values. The processor stores the collection of values as a stored collection of values in response to a difference between the performance objective and the performance measure satisfying a predetermined threshold. The processor, in response to a predetermined termination condition being satisfied, configures the first control loop and the second control loop according to the stored collection of values for the parameters.

According to yet another embodiment, a computer product for tuning a variable air volume (VAV) system is described. The VAV system includes a first proportional-integral-derivative (PID) controller and a second PID controller. The computer product includes computer readable storage medium having computer executable instructions embodied thereon. The computer readable storage medium includes instructions to generate a collection of values for parameters of the first PID controller and the second PID controller based on stored information that includes a stored velocity and a stored position. The computer readable storage medium also includes instructions to evaluate the collection of values based on a comparison of a predetermined performance objective of the system and a performance measure calculated based on the collection of values. The computer readable storage medium also includes instructions to store the collection of values as a stored collection of values in response to a difference between the performance objective and the performance measure satisfying a predetermined threshold. The computer readable storage medium also includes instructions that in response to a predetermined termination condition being satisfied configure the first PID controller and the second PID controller according to the stored collection of values for the parameters.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed here are technical solutions for automatically tuning a PID controller, such as a PID controller in a building control system. For example, in a building control system, such as a variable air volume (VAV) system, controlling a supply air damper and reheat coil affects efficiency of the VAV system. However, PID control loops in the VAV system are traditionally intervened and cannot be easily tuned separately using existing tuning methods. Further, for continuously operating the VAV system at optimal efficiency, the PID control loops are frequently tuned based on knowledge of the process. Hence, usually a technical specialist or an expert engineer tunes the PID controller based on experience, seasonal changes, and operation modes of the VAV system.

For example, by tuning the three parameters P, I, and D in the PID controller, the controller may provide better control action designed for specific process requirements. Traditionally, PID controllers were tuned manually using simple rules that date back to the 1940s. These rules are based on process experiments and empirical data. For example, a step response method used to tune the PID controller is based on measurement of an open-loop step response. In another example, a frequency response method that is used is based on a closed loop experiment where the system is brought to a stability boundary under proportional control. However, the traditional rules cause the system to operate poorly. The performance of the VAV system may be measured using various parameters or a combination thereof. For example, the performance of the VAV system may be measured based on energy consumed by the system. Alternatively or in addition the performance may be based on a comfort level of a user of the VAV system, where the comfort level may take into account a rate of change in temperature, humidity, or any other attributes. Of course, other parameters may dictate the performance measurement of the VAV system.

The technical solutions described herein provide automatic PID controller tuning. For example, the solutions may be used to tune the VAV system. Based on a specific optimization objective such as minimum energy consumption and/or maximum occupant comfort, controller parameters for multiple PID controllers in the VAV system. In one embodiment, the PID control tuning couples a Gain-Phase Margin method with a Particle Swamp Optimization (PSO) algorithm. It is understood that while the examples herein describe tuning a PID controller in a building control system such as a VAV system, the technical solutions described herein are applicable in other settings in which one or more PID controllers are used.

Figure 1:
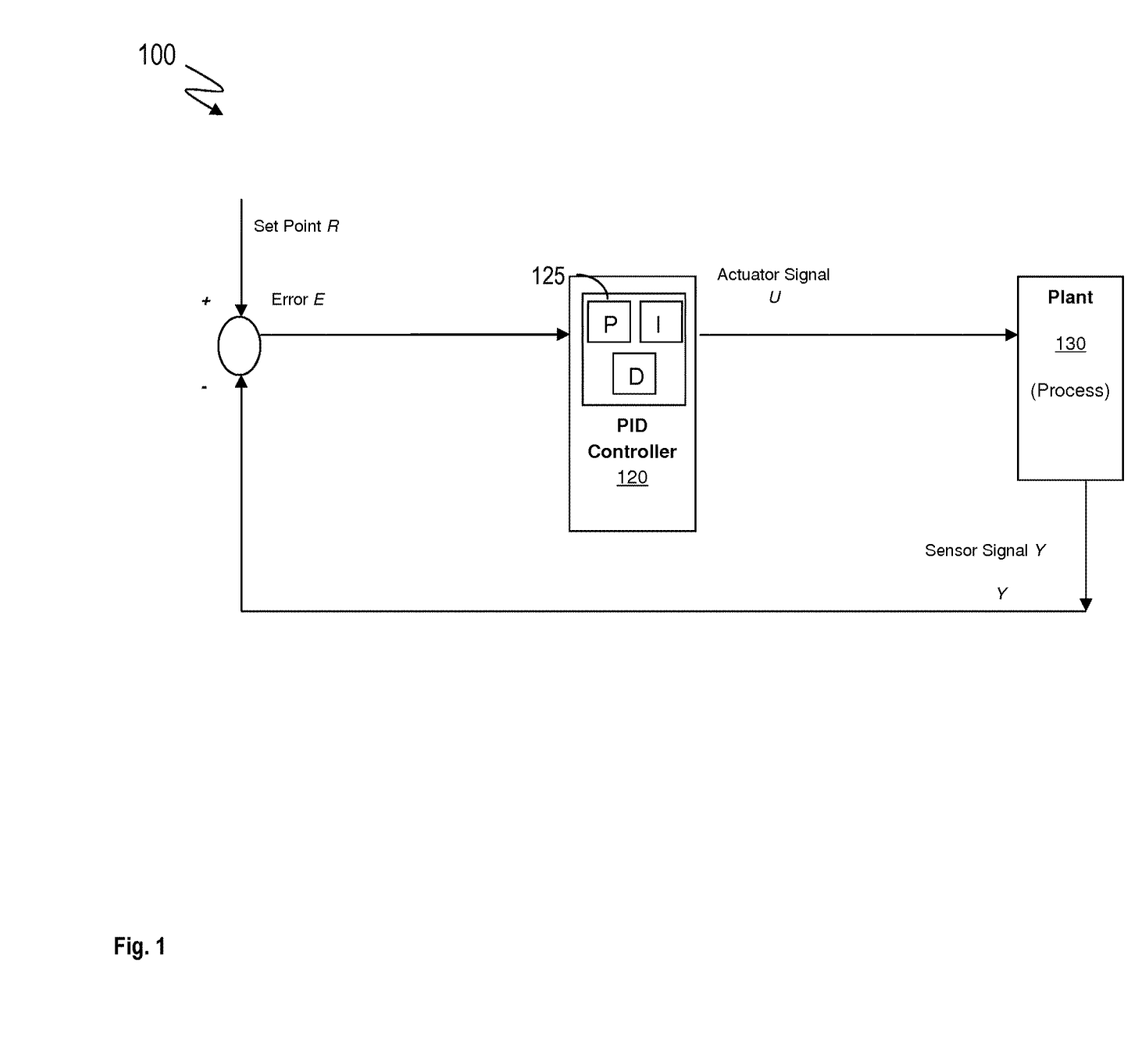
FIG. 1 illustrates a PID controller used in an industrial control system in accordance with an embodiment.

FIG. 1 illustrates a PID controller 120 being used as a control loop feedback controller in an industrial control system 100. The PID controller 120 provides a control action designed for process requirements of a plant 130. The PID controller 120 continuously calculates an "error value" (E) as the difference between a measured process variable (Y) that is measured using a sensor and a desired set point (R). The PID controller 120, in response, attempts to minimize the error E over time by adjustment of a control variable. For example, the PID controller 120 minimizes the error E by changing a position of a control valve, a damper, or an amount of power supplied to an element in the industrial control system.

The PID controller 120 is tuned by configuring PID parameters 125. The PID parameters 125 include the three parameters P, I, and D. P represents present values of the error E (for example, if the error is large and positive, the control output will also be large and positive). I is representative of past values of the error E (for example, if the output is not sufficient to reduce the size of the error, error will accumulate over time, causing the controller to apply stronger output). D is representative of predicted future values of the error E, based on its current rate of change.

Figure 2:
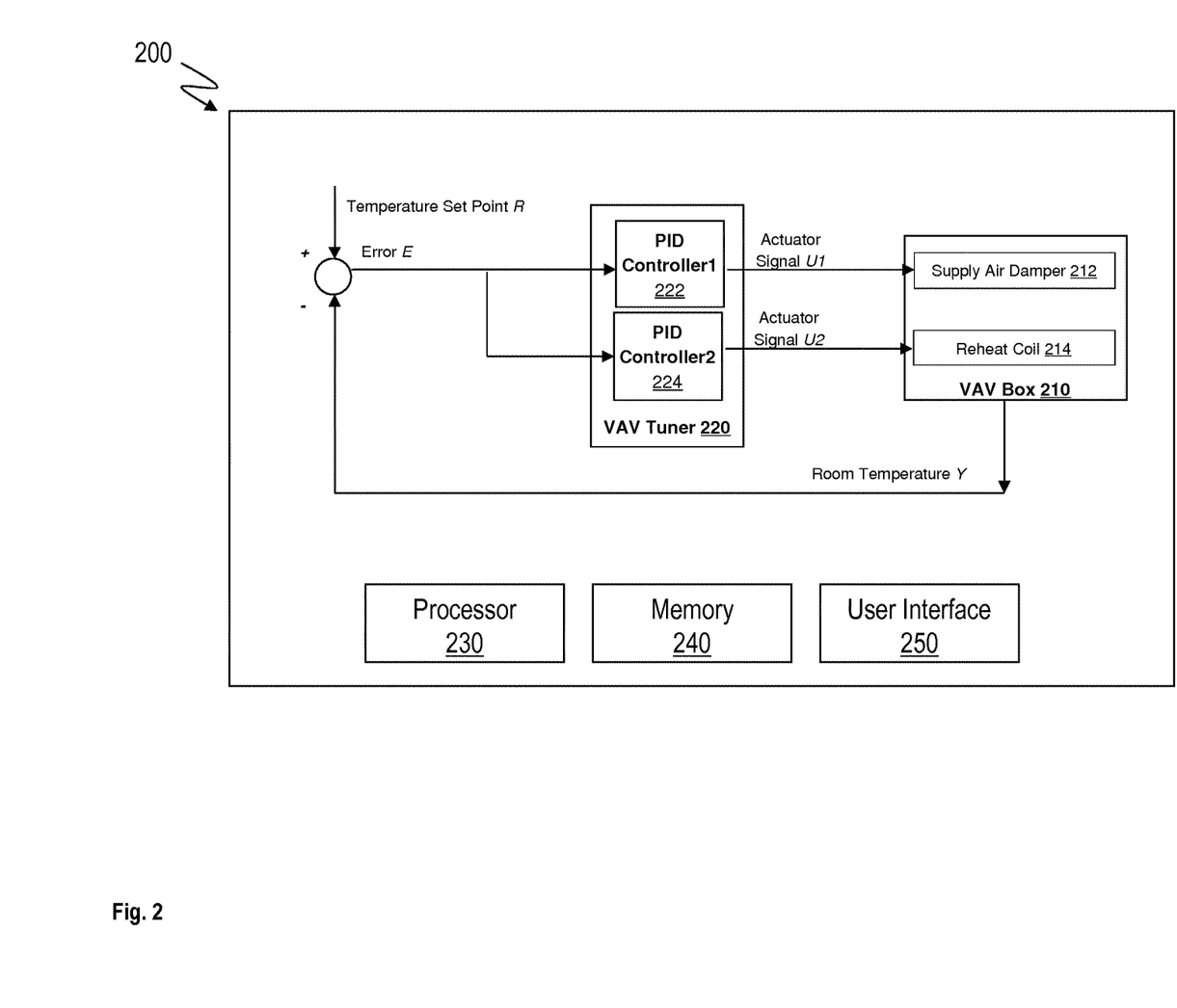
FIG. 2 illustrates an example circuitry of a VAV system in accordance with an embodiment.

FIG. 2 illustrates an example circuitry of a VAV system 200. The VAV system 200 in a building control system is a type of a Heating, Ventilating, and Air Conditioning (HVAC) system that regulates airflow in the building, such as in a room, hallway, lobby, or any other space. The VAV system 200 varies airflow at a constant temperature to achieve more precise temperature control, reduced compressor wear, and lower energy consumption. The VAV system 200 includes, among other components, a VAV box 210 that includes a supply air damper 212 and a reheat coil 214. The supply air damper 212 and the reheat coil 214 regulate flow and temperature of the air circulated by the VAV system 200. Control of the system's fan capacity is critical in the VAV system 200. Without proper and rapid flow rate control, over pressurization damages the VAV system's 200 ductwork, and/or sealing. Better control and less temperature variation lead to less energy consumption. To achieve optimal control performance through the different seasons, and for multiple operation modes, the VAV system 200 an expert engineer, typically, continuously tunes the VAV system 200 over time, particularly tuning the supply air damper 212 and the reheat coil 214.

Tuning the VAV system 200 manually is based on the expert engineer's experience. For example, in the VAV system 200, controlling the supply air damper 212 and the reheat coil 214 affects efficiency of the VAV system 200. The PID control loops in the VAV system 200 are intervened and cannot be easily tuned separately using existing tuning methods. Further, for operating the VAV system 200 at optimal efficiency continuously, the PID control loops should be frequently tuned, based on knowledge of the process. Hence, usually the expert engineer tunes the PID controllers 222 and 224 based on his/her experience, seasonal changes, and operation modes of the VAV system 200.

In an example, the VAV system 200 includes a VAV tuner 220, a processor 230, a memory 240, and a user interface 250.

The processor 230 may be a central processor of the VAV system 200 responsible for execution of an operating system and control instructions of the VAV system 200. The processor 230 may be one or more devices operable to execute logic. The logic may include computer executable instructions or computer code embodied in the memory 240 or in other memory that when executed by the processor 230, cause the processor 230 to perform the features implemented by the logic. The computer code may include instructions executable with the processor 230. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processor 230 may be a general processor, central processing unit, server, application specific integrated circuit (ASIC), digital signal processor, field programmable gate array (FPGA), digital circuit, analog circuit, or combinations thereof. The processor 230 may be in communication with the memory 240 and the other components of the VAV system 200.

The memory 240 may be non-transitory computer storage medium. The memory 240 may be DRAM, SRAM, Flash, or any other type of memory or a combination thereof. The memory 240 may store control instructions executable by the processor 230.

The user interface 250 may include a display, a speaker, a light emitting device (such as a light emitting diode), or any other component. The display may be touch screen enabled, include buttons, or include any other user interaction elements. The user interface 250 may be circuitry, such as processor, memory, communication interfaces, integrated circuits, antennas, resistors, capacitors, and any other hardware components. The user interface 250 may also involve software. For example, the user interface 250 may involve instructions and/or data that may be stored in the memory 240. The instructions and/or data may control operations of the user interface 250. The instructions may be computer executable. The data may include parameters and/or preset conditions associated with the user interface 250. The VAV system 200 receives input data from the user interface 250, such as the performance objective, a desired temperature level, a desired humidity level, and other such input.

The VAV tuner 220 tunes the VAV box 210 and other components of the VAV system 200. For example, the VAV tuner 220 includes a PID controller 222 corresponding to the supply air damper 212 and a PID controller 224 corresponding to the reheat coil 214. Each of the PID controllers 222 and 224 has a control loop to manage the corresponding circuit of the supply air damper 212 and the reheat coil 214 respectively. The PID controller 222 modulates the supply air damper 212 of the VAV box 210 for cooling and the PID controller 224 modulates the reheat coil valve for heating.

When in heating, the VAV box 210 either maintains minimum airflow or modulates the supply air damper 212.

Figure 3:
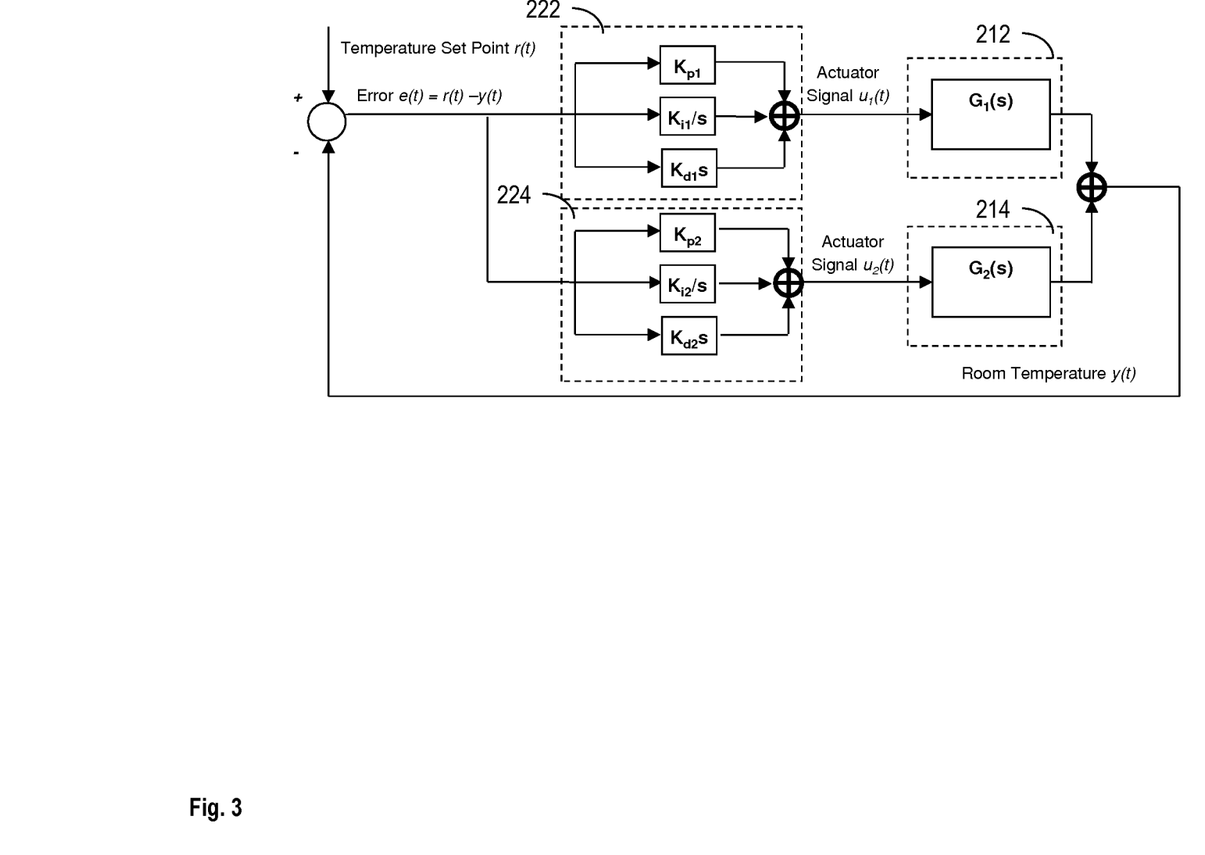
FIG. 3 illustrates control loops of an example VAV system in accordance with an embodiment.

FIG. 3 illustrates example control loops of the VAV system 200 in more detail. $G_1(s)$ and $G_2(s)$ are system models of the supply air damper 212 and the reheat coil 214 respectively. The PID controllers 222 and 224 control the respective system models according to actuator signals $U_1$ and $U_2$ respectively. The VAV box 210 varies the room temperature Y based on the system models $G_1(s)$ and $G_2(s)$. In an example, the VAV system 200 may be set to maintain the temperature at a set point R. Accordingly, the VAV system 200 may compare the room temperature Y with the set point R to determine a difference, or error E between the objective temperature and the actual temperature. The VAV tuner 220 tunes the VAV box 210 to increase or decrease the temperature Y to satisfy the objective R. The VAV tuner 220 tunes the VAV box 210 using the actuator signal $U_1$ from the PID controller 222 to the supply air damper 212 and the actuator signal $U_2$ from the PID controller 224 to the reheat coil 214.

The actuator signals output by the PID controllers 222 and 224 depend on the parameters $K_P$, $K_I$, and $K_D$ of the respective PID controller. For example, the output actuator signals of the two PID controllers 222 and 224 in Laplace form are:

$$u_1(s) = e(s)\left(K_{p1} + \frac{K_{i1}}{s} + K_{d1}s\right)$$

$$u_2(s) = e(s)\left(K_{p2} + \frac{K_{i2}}{s} + K_{d2}s\right)$$

The transfer functions (control laws) of the two PID controllers 222 and 224 may be expressed as:

$$C_1(s) = \frac{u_1(s)}{e(s)} = \left(K_{p1} + \frac{K_{i1}}{s} + K_{d1}s\right)$$

$$C_2(s) = \frac{u_2(s)}{e(s)} = \left(K_{p2} + \frac{K_{i2}}{s} + K_{d2}s\right)$$

Thus, varying the parameters $K_P$, $K_I$, and $K_D$ of the PID controllers 222 and 224 affects the corresponding components of the VAV box 210 and in turn the room temperature Y.

Further, in an example the VAV system 200 is associated with a stability constraint. For example, a stability grade of the VAV system 200 may be a predetermined range or value of a phase margin $P_m$. The phase margin may be determined based on an open-loop transfer function $L(s)$ of the VAV system 200, which is specified as:

$$L(s)=C_1(s)G_1(s)+C_2(s)G_2(s)$$

The open-loop frequency response $L(j\omega)$ may subsequently be obtained by substituting "s" with "j$\omega$." The crossover frequency $\omega_c$ is directly related to the system response time $\tau$ as:

$$\tau = \frac{1}{\omega_c}$$

The system stability constraints may then be expressed as:

$|L(j\omega)|=1$ at $\omega=\omega_c$ $P_m = 180 + \arg[L(j\omega)]$

For example, the stability and system response constraint may be that the phase margin value is in the range of 30~45 degree or any other range or value in which the specified stability constraint provides a well-damped system response.

The VAV system 200 is to be tuned based on an optimization objective such as minimum energy consumption and/or maximum occupant comfort. Tuning the VAV system 200 includes finding optimal PID parameters for the multi PID controllers. Further, the objective of the optimization is to tune the PID controllers 222 and 224 so that the total energy consumption of the VAV system 200 is minimized, without discomforting occupants'. For example, better control of the airflow and less temperature variation lead to less energy consumption and better occupant comfort. Thus, to minimize the total energy consumption the cost function to consider is to minimize temperature control error using the PID controllers 222 and 224 of the VAV tuner 220.

For example, based on the system model $G_1(s)$ and $G_2(s)$, and the models of the PID controllers $C_1(s)$ and $C_2(s)$, an objective step response of the VAV system 200 is determined. For example, the system response (temperature control) performance criteria may be based on a Mean Squared Error (MSE), an Integral of the Squared Error (ISE), and a Maximum Overshoot Error (MOE). The MSE is calculated as:

$$MSE = \sigma^2$$

The ISE is calculated as:

$$ISE = \int_0^\infty e^2(t)dt$$

Above equation is the standard deviation of the error. The objective function, J, which is to be minimized to avoid larger overshoot values and to obtain satisfactory dynamics in the transient response, is then specified by:

$$J = w1 \cdot MSE + w2 \cdot ISE + w3 \cdot MOE$$

where w1, w2, and w3 are the weighted values for the corresponding performance criteria, MSE, ISE, and MOE.

Thus, optimizing the performance of the VAV system 200 includes tuning multiple control loops, such as those of the PID controllers 222 and 224 according to the specific objective such as minimization of the energy consumption. However, the two PID control loops are intervened and cannot be easily tuned separately using existing tuning methods. Further, the optimization is to satisfy the stability constraint of the VAV system 200, such as the gain-phase margin. Accordingly, the technical solutions describe tuning the PID controllers 222 and 224 in tandem, such as by coupling a Gain-Phase Margin method with a Particle Swarm Optimization (PSO) algorithm.

The PSO algorithm is derived from a social psychological theory and has been found to be robust for solving problems featuring nonlinearity and non-differentiability, multiple optima, and high dimensionality through adaptation. PSO is a population based search algorithm, which is initialized with a population of random solutions, called particles. Each particle in the PSO is also associated with a velocity. Particles are considered to fly through the search space with respective velocities, which are dynamically adjusted according to historical behaviors of the particles. Therefore, the particles have a tendency to fly towards better and better solutions over the course of search process.

The updating rule for PSO algorithm is described as:

$$\vec{v}_{i+1} = w \times \vec{v}_i + c_1 \times rand_1 \times (\vec{x}_p - \vec{x}_i) + c_2 \times rand_2 \times (\vec{x}_g - \vec{x}_i)$$

$$\vec{x}_{i+1} = \vec{x}_i + \vec{v}_{i+1}$$

where w, $c_1$ and $c_2$ are the inertia weight, cognitive acceleration and social acceleration constants respectively; $rand_1$ and $rand_2$ are two random numbers; $x_i$ represents the location of the $i^{th}$ particle; $x_p$ represents the best solution (fitness) the particle has achieved so far; $x_g$ represents the overall best location obtained so far by all particles in the population; $v_i$ represents the velocity of the particle with $v_i^{min} \leq v_i \leq v_i^{max} \cdot v_i^{max}$ determines the resolution, or fitness, with which regions between the present position and target position are searched. The constants $c_1$ and $c_2$ represent the weighting of the stochastic acceleration terms that pull each particle toward $x_p$ and $x_g$ positions.

Figure 4:
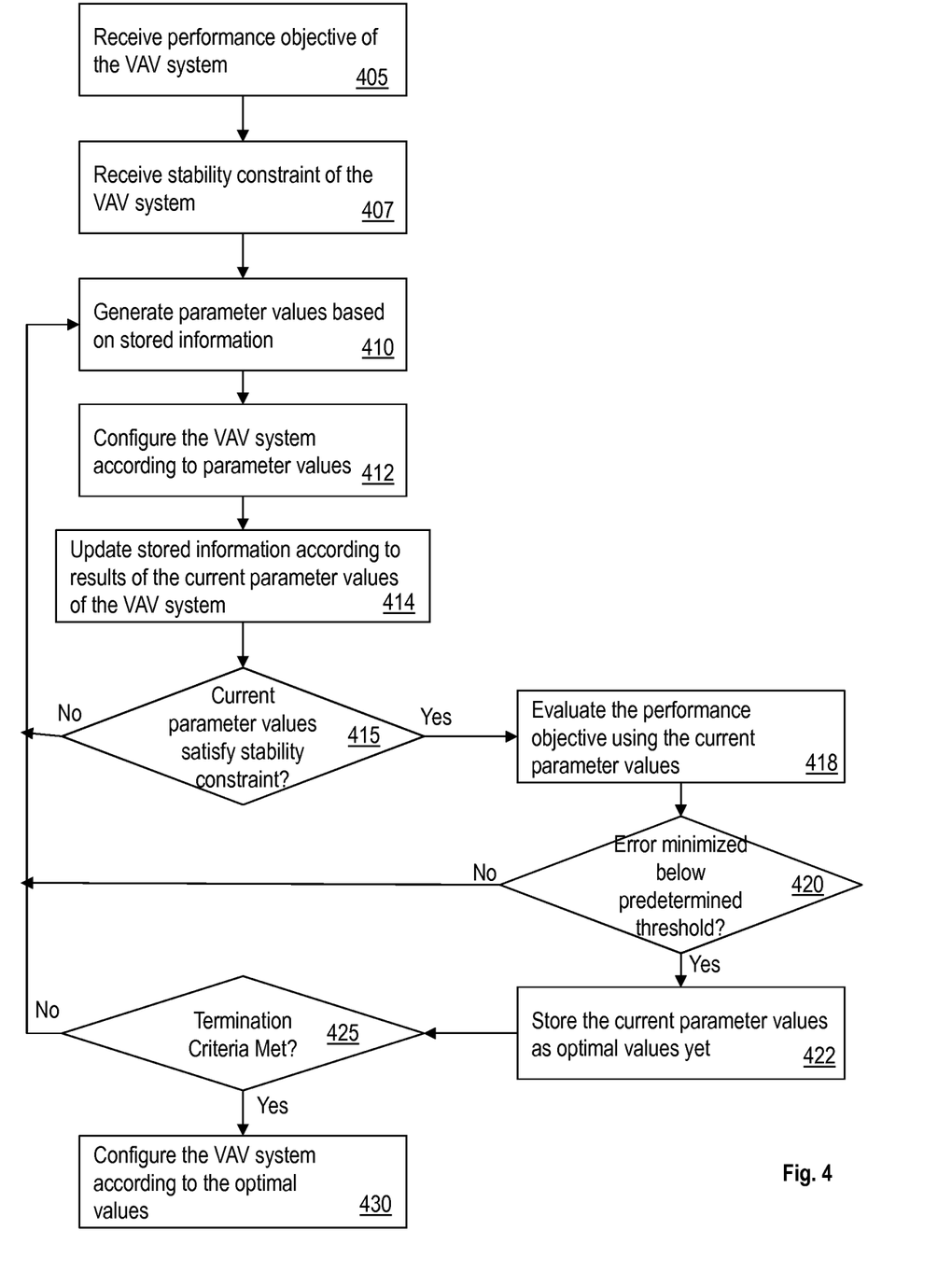
FIG. 4 illustrates a flowchart of example logic to tune multiple control loops of a VAV system in accordance with an embodiment.

FIG. 4 illustrates example logic to tune the multiple control loops of the VAV system 200. The logic may be implemented by the processor 230. The performance objective of the VAV system 200 is set, as shown at block 405. The stability constraint of the VAV system 200 is also set, as shown at block 407. The VAV system 200, for example using the VAV tuner 220, generates an initial collection of parameter values for the PID controllers 222 and 224, as shown at block 410. In an example, the initial parameter values are default values, for example, that the VAV tuner 220 reads from the memory 240. The parameters values are a collection of values for the P, I, and D, parameters of the PID controllers 222 and 224. The collection of parameter values is used as a particle for applying a PSO algorithm to optimize the parameter values. The velocity and position of the particle are initialized according to values that are stored in the memory 240. In an example, the velocity and position values are used to generate the parameter values, as shown at block 410. Once the parameter values are generated, the processor 230 updates the stored information based on the generated parameter values, as shown at block 414. For example, using the parameter values, the processor 230 calculates updated velocity and position and stores the updated values in the memory 240.

The processor 230 configures the VAV system 200 according to the generated parameter values, as shown at block 412. Alternatively, the processor simulates the operation of VAV system 200 according to the parameter values using the equations described herein. The processor 230 determines if the parameter values satisfy the stability constraint, as shown at block 415. If the stability constraint is not satisfied, the processor 230 generates a second set of parameter values based on the updated velocity and position information, as shown at block 410. Else, if the stability constraint is satisfied, the processor 230 evaluates the parameter values according to the performance objective, as shown at block 418. For example, the processor 230 may determine the resulting error E, based on the generated parameter values using the equations described herein. Alternatively, the processor 230 determines the error E based on actual measurement of the room temperature Yin response to configuring the PID controllers 222 and 224 according to the generated parameter values.

The processor 230 determines if the error E has been minimized to deem the performance objective met, as shown at block 420. For example, the processor 230 may compare E with a predetermined threshold. If the error value E has been minimized according to the predetermined threshold, the processor 230 may store the parameter values as the optimal (or best) parameter values yet, as shown at block 422. If not, the processor 230 generates a second set of parameter values based on the updated velocity and position information, as shown at block 410. The processor 230 may also store the error value E as the predetermined threshold value for a next iteration.

The processor 230 may determine if a termination criterion has been met, as shown at block 425. For example, the termination criteria may be a number of optimal parameter values found. For example, the termination criteria may specify that the processor 230 find five collections of optimal parameter values. If the termination criteria are met, the processor 230 configures the PID controllers 222 and 224 according to the optimal parameter values that are stored in the memory 240, as shown at block 430. In the above example, the processor 230 uses the fifth collection to configure the PID controllers 222 and 224. If the termination criteria are not met, the processor 230 continues to generate another collection of parameter values for the PID controllers 222 and 224 using the updated stored information, as shown at block 410. The processor 230 may keep track of a number of optimal parameter values generated and stored using a counter value stored in the memory 240 (not shown).

Thus, according to the above method, according to the Gain-Phase Margin constraint, the processor 230 determines the optimal PID parameter values to minimize the temperature control error, which leads to minimal energy consumption and maximum thermal comfort using the VAV system 200. In an example, the processor 230 uses the above method continuously tuning the PID controllers 222 and 224 to meet the performance objective. Thus, the method facilitates optimizing the VAV system 200 that includes multiple PID control loops by applying a PSO algorithm.

The technical solutions described herein provide PID control tuning, which combines the Gain-Phase Margin stability consideration and the PSO algorithm. The optimized PID controller parameters for the VAV box 210 facilitate system stability and the PSO algorithm reduces the computational effort to identify the optimal parameter values to satisfy the performance objective.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method for tuning a system that comprises intervened control loops, the method comprising:
    receiving, by a processor disposed in the system, a performance objective of the system;
    generating, by the processor, a collection of values respectively corresponding to a plurality of parameters of the intervened control loops, the collection of values for the parameters generated based on stored information that comprises a velocity and a position of a Particle Swarm Optimization (PSO) particle;
    determining whether the collection of values satisfy a gain-phase margin constraint, so as to couple a gain-phase stability consideration with a PSO algorithm;
    in response to the gain-phase margin constraint being satisfied, evaluating, by the processor, the collection of values for the parameters of the intervened control loops, wherein the evaluating comprises:
    determining, by the processor, a performance measure of the system using the collection of values; and
    comparing, by the processor, the performance measure and the performance objective of the system so as to determine a difference between the performance measure and the performance objective;

in response to a determination that the difference falls within a predetermined threshold, updating the stored information by storing the collection of values as a stored collection of values for the parameters representative of a most optimized set of parameter values yet;
in response to the difference exceeding the predetermined threshold, generating another set of parameters based on the velocity and position; and
in response to a predetermined termination condition being satisfied, configuring the intervened control loops according to the stored information for the parameters;
wherein the system is a variable air volume system, the intervened control loops include a first control loop for a supply air damper and a second control loop for a reheat coil of the system, and the parameters of the intervened control loops include a first set of parameters of a first proportional-integral-derivative (PID) controller of the first control loop and a second set of parameters of a second PID controller of the second control loop of the system.

2. The method of claim 1, wherein the method further comprises:
receiving, by the processor, a stability constraint; and
determining, by the processor, the stability of the system using the collection of values.

3. The method of claim 2, wherein the evaluating of the values for the parameters is in response to the stability of the system satisfying the stability constraint.

4. The method of claim 3, wherein updating the stored information further comprises updating the velocity and the position based on the stored collection of values.

5. The method of claim 4, wherein the collection of values is a first collection of values, and in response to the predetermined termination condition not being satisfied, the method further comprises:
generating, by the processor, a second collection of values for the parameters of the intervened control loops based on the velocity and the position that is updated according to the first collection of values;
evaluating, by the processor, the second collection of values; and
updating the stored information in response to a difference between the performance objective and the performance measure using the second collection of values satisfying the predetermined threshold.

6. The method of claim 1, wherein the performance objective of the system is to minimize energy consumption by reducing variation in temperature of airflow output by the variable air volume system.

7. A variable air volume (VAV) system comprising:
a first proportional-integral-derivative (PID) controller that modulates a supply air damper of the VAV system via a first control loop; and
a second PID controller that modulates a reheat coil of the VAV system via a second control loop, the first control loop and the second control loop being intervened with each other; and
wherein the system is configured to:
generate a collection of values for parameters of the first control loop and the second control loop based on stored information that comprises a velocity and a position of a Particle Swarm Optimization (PSO) particle, each value in the collection of values corresponding to a respective parameter;
determine whether the collection of values satisfy a gain-phase margin constraint, so as to couple a gain-phase stability consideration with a PSO algorithm;

in response to the gain-phase margin constraint being satisfied, evaluate the collection of values by determining a difference between a predetermined performance objective of the system and a performance measure calculated based on the collection of values;
store the collection of values as a stored collection of values representative of a most optimized set in response to the difference satisfying a predetermined threshold;
in response to the difference exceeding the predetermined threshold, generate another collection of values for parameters of the first control loop and the second control loop based on the velocity and the position; and
in response to a predetermined termination condition being satisfied, configure the first control loop and the second control loop according to the stored collection of values for the parameters.

8. The VAV system of claim 7, wherein the system is further configured to:
calculate an updated velocity and an updated position if the difference satisfies the predetermined threshold; and
replace the velocity and the position with the updated velocity and the updated position, respectively, so as to update the stored information.

9. The VAV system of claim 8, wherein the system is further configured to:
determine a stability of the system based on the collection of values; and
compare the predetermined performance objective and the performance measure based on the collection of values in response to the stability of the system satisfying a predetermined stability constraint.

10. The VAV system of claim 8, wherein the collection of values is a first collection of values, and in response to the predetermined termination condition not being satisfied, the system is further configured to:
generate a second collection of values based on the stored information that is updated according to the first collection of values;
evaluate the second collection of values; and
store the second collection of values as the stored collection of values in response to a difference between the performance objective and the performance measure using the second collection of values satisfying the predetermined threshold.

11. The VAV system of claim 10, wherein the parameters of the first control loop and the parameters of the second control loop each include a proportional, an integral, and a derivative parameter.

12. The VAV system of claim 7, wherein the performance objective is to minimize energy consumption of the VAV system.

13. The VAV system of claim 12, wherein the performance objective is determined based on a mean squared error, an integral of the squared error, and a maximum overshoot error of each of the first PID controller and the second PID controller.

14. The VAV system of claim 13, wherein the system is further configured to:
determine a stability of the system according to a predetermined stability constraint and based on the collection of values, wherein the predetermined stability constraint is the gain-phase margin constraint; and
compare the predetermined performance objective and the performance measure based on the collection of values in response to the stability of the system satisfying a predetermined stability constraint.

\* \* \* \* \*